United States Patent
Shah

(10) Patent No.: US 8,673,380 B2
(45) Date of Patent: Mar. 18, 2014

(54) METHOD OF INFUSING FLAVOR IN CEREAL GRAINS

(75) Inventor: Sujaykumar S. Shah, Toronto (CA)

(73) Assignee: Jardyl Holdings Inc., Vaughan, Ontario (CA)

(*) Notice: Subject to any disclaimer, the term of this patent is extended or adjusted under 35 U.S.C. 154(b) by 42 days.

(21) Appl. No.: 13/370,347

(22) Filed: Feb. 10, 2012

(65) Prior Publication Data

US 2013/0209637 A1 Aug. 15, 2013

(51) Int. Cl.
*A23L 1/182* (2006.01)

(52) U.S. Cl.
USPC ........... 426/455; 426/460; 426/506; 426/507; 426/615; 426/618

(58) Field of Classification Search
USPC .................. 426/455, 460, 506, 507, 615, 618
See application file for complete search history.

(56) References Cited

U.S. PATENT DOCUMENTS

| | | | |
|---|---|---|---|
| 4,927,660 A * | 5/1990 | Sano | 426/618 |
| 5,846,584 A | 12/1998 | Capodieci | |
| 6,143,336 A | 11/2000 | Capodieci | |
| 6,403,132 B1 | 6/2002 | Capodieci | |
| 6,780,449 B2 * | 8/2004 | Razaa | 426/281 |
| 7,740,894 B2 * | 6/2010 | Squire et al. | 426/619 |
| 2006/0292277 A1 | 12/2006 | Gics | |
| 2010/0310739 A1 * | 12/2010 | Smyth et al. | 426/281 |

* cited by examiner

*Primary Examiner* — Lien T Tran
(74) *Attorney, Agent, or Firm* — Sand & Sebolt

(57) ABSTRACT

A method of infusing flavor into cereal grains. The method includes the steps of preparing a liquid seasoning having a flavor, increasing the porosity of the cereal grains, infusing the more-porous cereal grains with the flavor of the liquid seasoning, and locking the flavor of the liquid seasoning into the flavor-infused cereal grains.

23 Claims, 6 Drawing Sheets

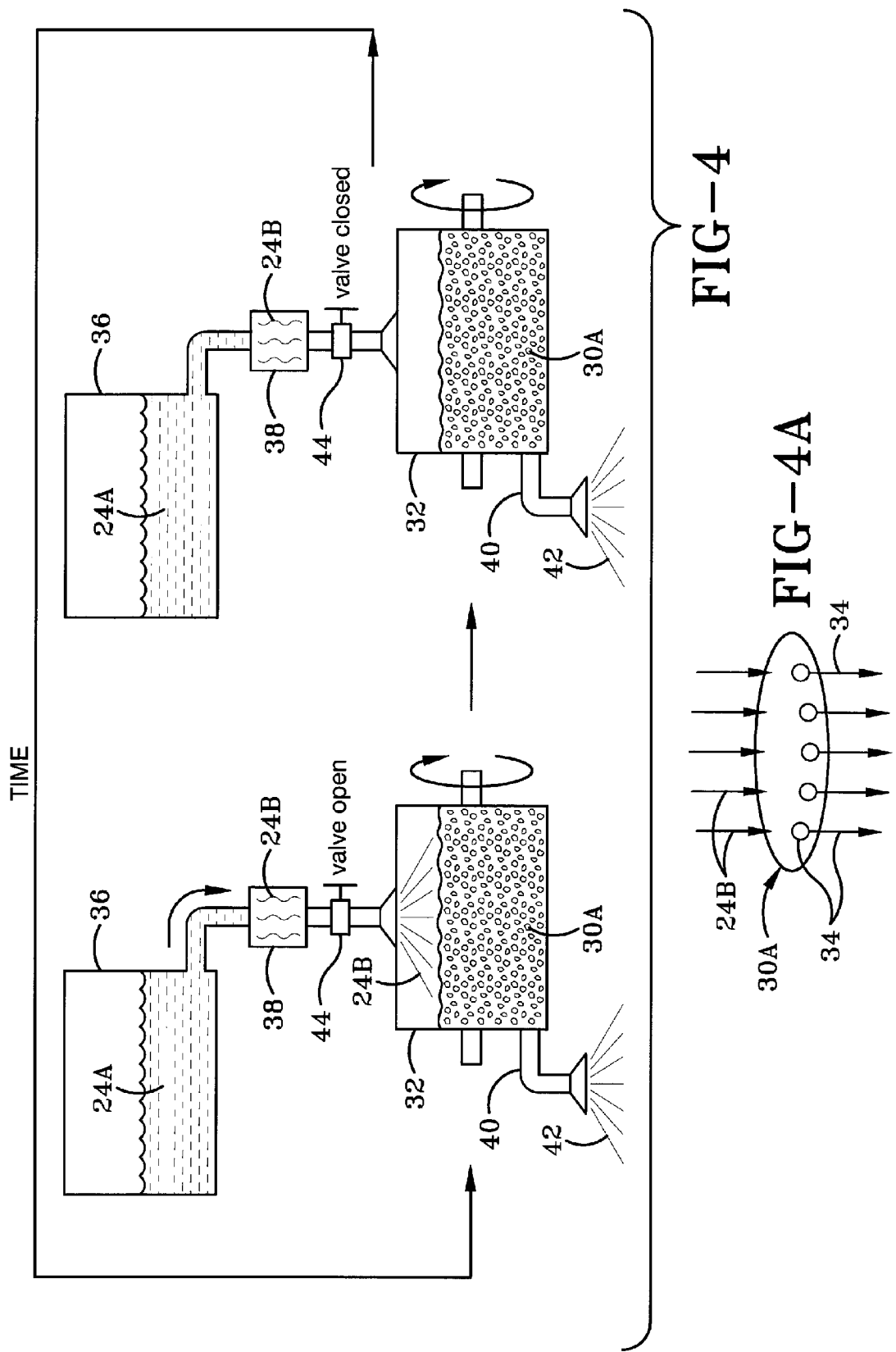

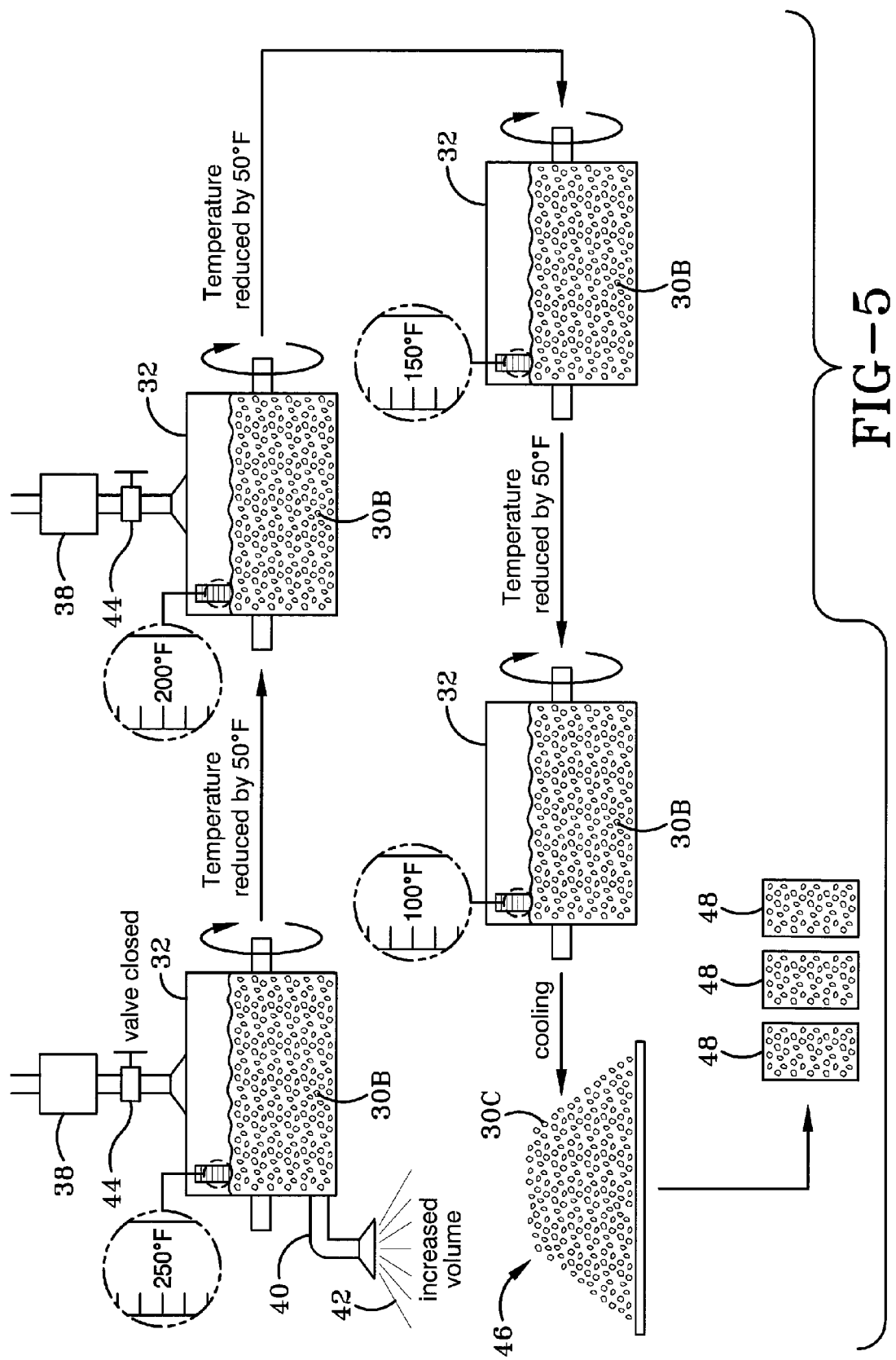

METHOD OF INFUSING FLAVOR IN CEREAL GRAINS

BACKGROUND OF THE INVENTION

1. Technical Field

This invention relates generally to food preparation and processing. More particularly this invention relates to the processing of cereal grains. Specifically, this invention relates to the infusion of flavors into cereal grains prior to the sale of the same to the consumer and includes a four step process comprising preparing a liquid seasoning, increasing the porosity of the cereal grains, infusing the flavor of the liquid seasoning into the more-porous cereal grains, and then locking the flavor into the flavor-infused cereal grains.

2. Background Information

It has become fairly common in recent years to add flavoring to food products that would typically be fairly bland without the addition of that flavoring. One of the food substances which have been treated in this manner is rice. Typically, the rice is packaged in such a way that the untreated grains are enclosed in a box along with a package of seasoning. The consumer will place a quantity of liquid in a pot; will add the uncooked rice and the contents of the flavor package. The contents of the pot will be heated and as the rice cooks, the exterior surface thereof is coated with the spices from the flavor package. There is little to no penetration of the flavor into the grain itself. Consequently, while the end product of such a flavoring methodology is relatively pleasant to eat, the flavors can be somewhat washed-out and a little on the bland side. Simply increasing the quantity of spice in the flavoring package would not necessarily make the end product more flavorful. It could simply result in the rice tasting like it has been treated in some slightly unpleasant chemical way.

An additional method of flavoring cereal grains is described in U.S. Pat. Nos. 5,846,584, 6,143,336 and 6,403,132, all assigned to Mars Incorporated. In these three patents, a process of infusing flavors into rice grains is disclosed. The rice is mixed with various flavorings such as spices, pieces of meat and vegetables etc., where the flavorings are in either a dry form or a liquid form. A quantity of liquid is added to the rice/flavoring mixture and the combined mixture is agitated for a short time, preferably around one minute. This is just enough time to disperse the flavorings and surface moistens the rice. The time is not sufficient to allow moisture to penetrate into the kernels and indeed it cannot so do because of the natural imperviousness of the rice kernels. The moistened rice/flavoring mixture is then placed into separate small containers and is subjected to high pressure and a burst of ultrasonic energy for around 30-80 milliseconds. That combined pressure and ultrasonic burst is apparently what drives the flavoring into the rice kernels. The process disclosed in these patents also shapes the rice and pieces of meat and vegetables into a cake and the product is sold in this form. While the shaped cakes are desirable in some applications, many consumers will not wish to purchase their flavored rice in this form.

There is therefore a need in the art for flavoring cereal grains, particularly rice, in an improved manner.

BRIEF SUMMARY OF THE INVENTION

A method of infusing flavor into cereal grains. The method includes the steps of preparing a liquid seasoning having a flavor, increasing the porosity of the cereal grains, infusing the more-porous cereal grains with the flavor of the liquid seasoning, and locking the flavor of the liquid seasoning into the flavor-infused cereal grains.

The step of preparing the liquid seasoning comprises the steps of selecting a first spice, adding the first spice to a quantity of liquid to make a liquid seasoning mixture, and boiling the liquid seasoning mixture for a first period of time.

The step of increasing the porosity of the cereal grains includes the steps of placing the cereal grains into a tumbler, heating the cereal grains in the tumbler to a first temperature, rotating the tumbler for a third period of time, heating the cereal grains in the tumbler to a second temperature, rotating the tumbler for a fourth period of time, adding a quantity of liquid into the tumbler, heating the cereal grains and liquid to a third temperature while rotating the tumbler.

The step of infusing the more-porous grains of cereal with the liquid seasoning includes the steps of heating the liquid seasoning to a temperature sufficient to generate a seasoned steam, introducing the seasoned steam into the tumbler with the more-porous cereal grains disposed therein, and rotating the tumbler for a fifth period of time to expose the more-porous grains of cereal to the seasoned steam.

The step of locking the flavor into the infused grains of cereal includes the steps of stopping the flow of seasoned steam into the tumbler, increasing the rate of evacuation of spent steam from the tumbler reducing an initial interior temperature of the tumbler by a first amount after a sixth period of time, reducing the interior temperature of the tumbler by a second amount after a seventh period of time, and continuing to decrease the interior temperature of the tumbler over additional periods of time until a pre-determined interior temperature of the tumbler is reached.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 4 is a schematic representation of the third step of the process which involves the infusion of flavor of the liquid seasoning into the more-porous cereal grains;

FIG. 4a is a stylized representation of a cereal grain showing the seasoned steam penetrating into the interior of the cereal grain and displacing the water which entered the grain interior when the grain was opened during processing; and FIG. 5 is a schematic representation of the fourth step of the process which involves locking the flavor into the infused cereal grains.

Similar numbers refer to similar parts throughout the drawings.

DETAILED DESCRIPTION OF THE INVENTION

The present invention relates to a manufacturing process for infusing cereal grains with a variety of different flavors prior to the purchase of those cereal grains by the consumer. The process also tends to reduce the required cook time for such cereal grains after they have been through the process of the present invention. The process is designed to infuse flavor into cereal grains such as rice, barley, wheat, millet, corn, sorghum, rye, triticale, buckwheat, and quinoa, amongst others. The processing times and temperatures will be varied according to the cereal grain being processed, but the basic methodology for infusing flavor into the various types of cereal grains is described hereafter.

This present description will relate to a method for infusing flavor into rice grains but as indicated above the method can be employed to infuse flavor into any suitable cereal grain without departing from the scope of the present invention. It should therefore be understood that the use of the word "rice" herein is by way of example only.

Figure 1:
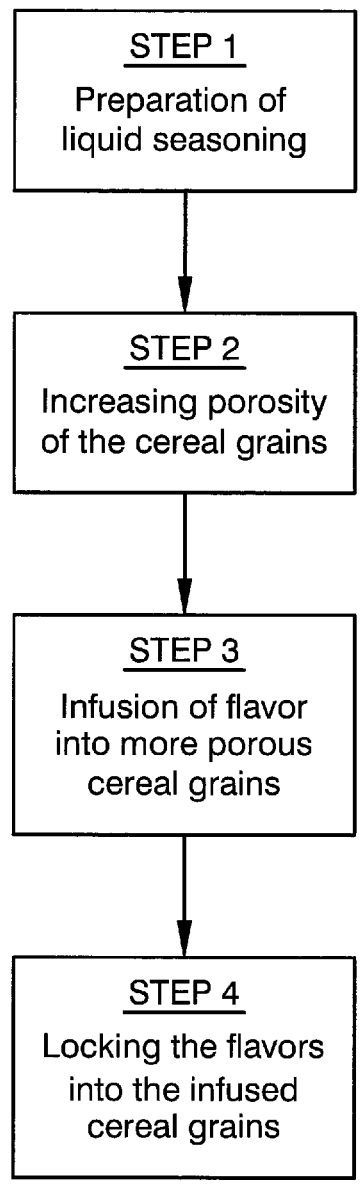
FIG. 1 is a schematic representation of the process of infusing cereal grains with flavor in accordance with the present invention.

The process is a four step process that is schematically illustrated in FIG. 1 and comprises a first step which involves the preparation of a liquid seasoning, a second step which involves increasing the porosity of the rice grains, a third step which involves infusing flavor into the more-porous rice grains, and a fourth step which involves locking the flavor into the flavor-infused rice grains.

The first step in the process is shown in greater detail in FIG. 2 and, as indicated above, involves the preparation of a liquid seasoning that has a flavor that will be used to flavor the rice grains. At least a first spice 10 is selected and is added to a quantity of liquid 12 in a container 14. The term "spice" is to be understood to represent any one of a wide range of seasonings, spices, herbs, plant extracts etc, that impart flavoring to food substances. The spices may be dry spices in the form of powders, dried flakes or leafs, or they may be wet spices such as edible herb or plant oils and/or extracts. Preferably, more than one of a number of different spices 10 will be added to liquid 12 in container 14. Each of the different spices 10 may be added individually to liquid 12 in container 14, or spices 10 may be mixed or blended together to in a separate container 13 to form a seasoning mixture 15 which is then added to liquid 12 in container 14. It will further be understood that liquid 12 may be placed in the container 14 before spices 10 or after the same. Preferably, a quantity of seasoning mixture 15 around 5 lbs in weight will be used to flavor around 100 lbs of rice. Specific examples of the seasoning mixtures 15 in accordance with the present invention are provided later herein. Preferably, liquid 12 is water.

Figure 2A:
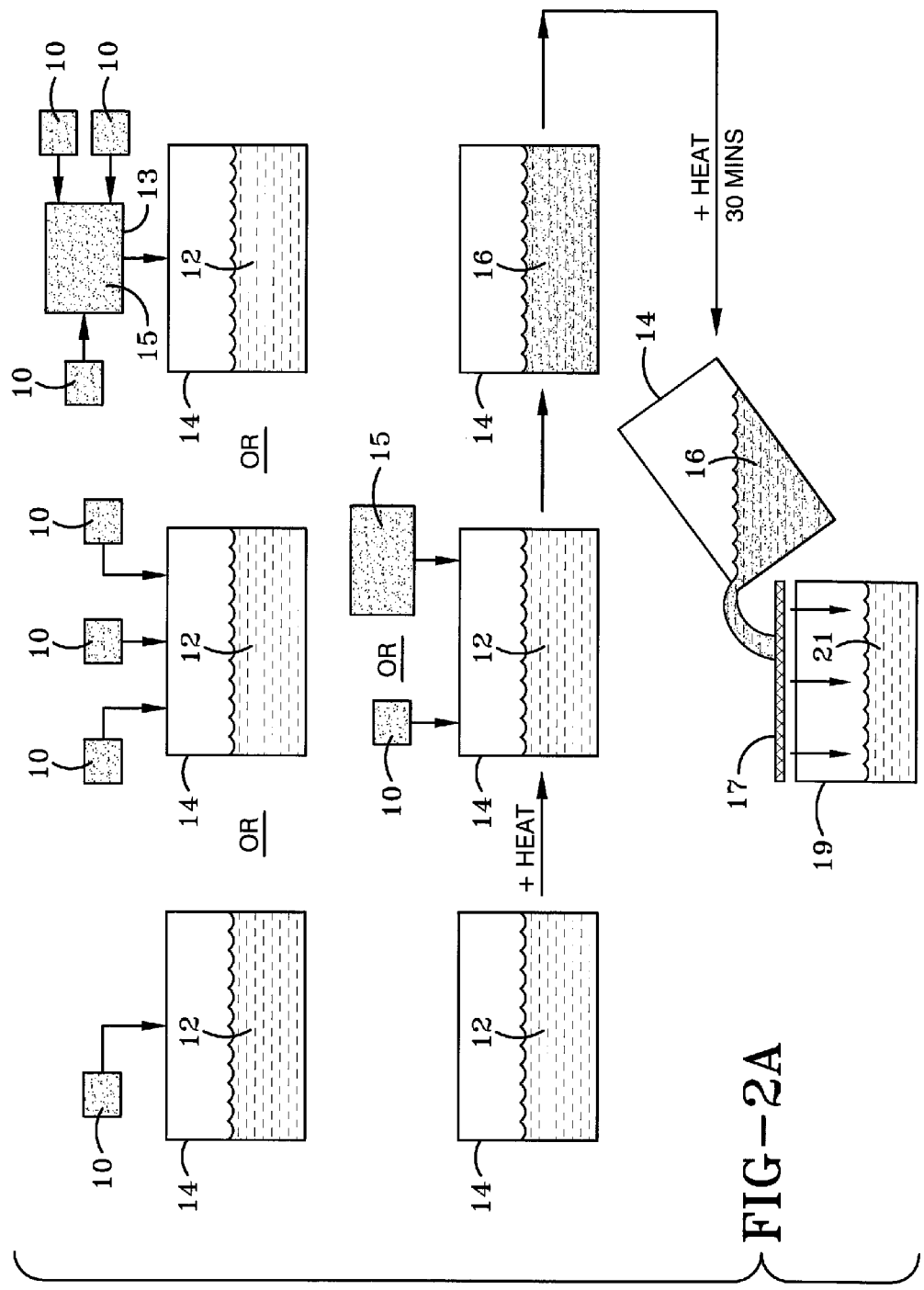
FIG. 2a is a schematic representation of a first embodiment of the first step of the process which involves the preparation of a liquid seasoning.

In a first embodiment of the process, shown in FIG. 2a, liquid 12 is heated prior to addition of the one or more spices 10 or to the addition of seasoning mixture 15 thereto. Preferably, liquid 12 is heated to a temperature of around 400° F. and after spice 10 or seasoning mixture 15 is added thereto, the liquid seasoning mixture 16 is boiled at or around 400° F. for a time period of about thirty minutes. Liquid seasoning mixture 16 is then poured through a screen 17, preferably a 60 mesh screen, and into another container 19 to remove any particles and sediments. Container 19 therefore holds a quantity of strained liquid seasoning 21.

Figure 2B:
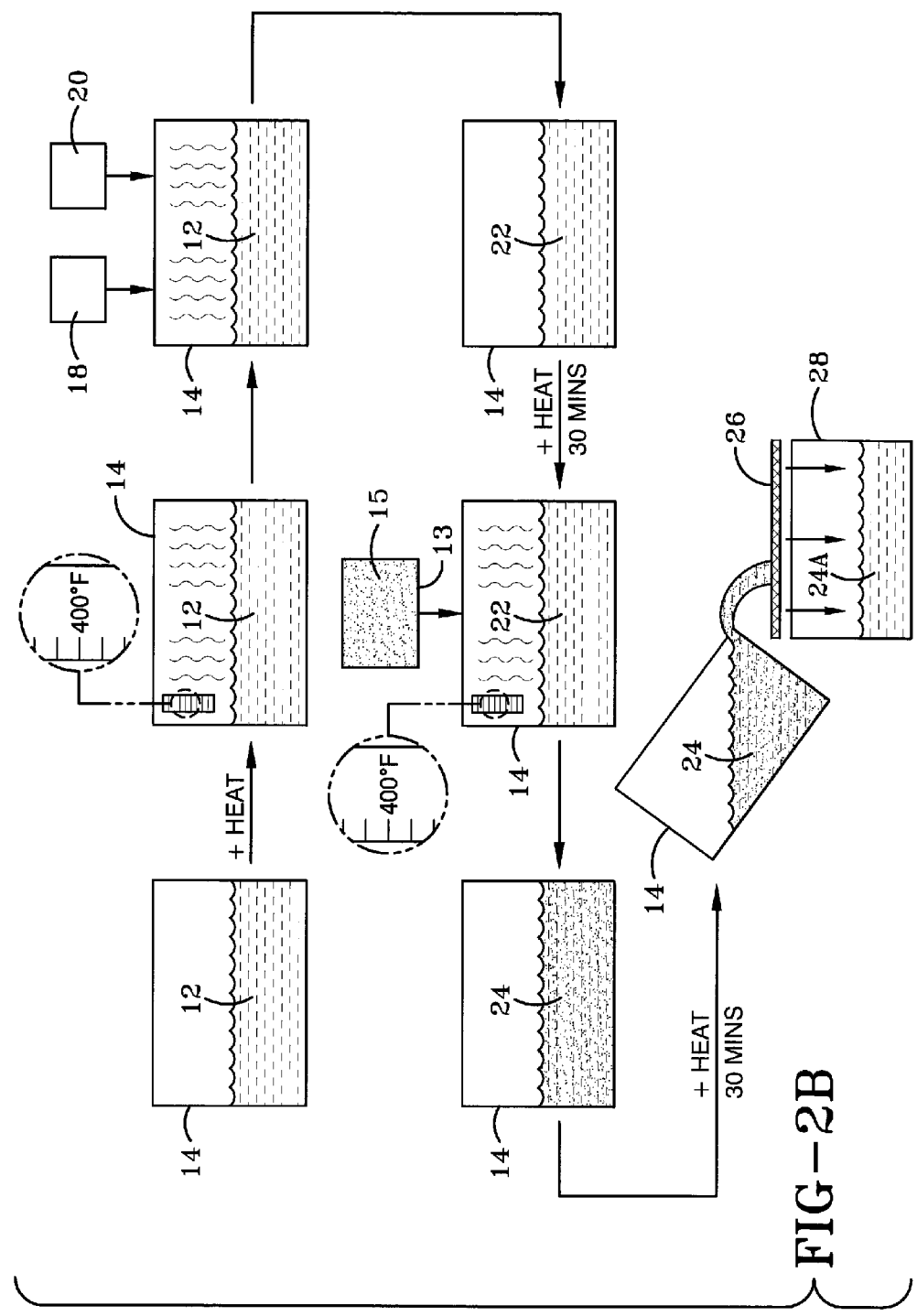
FIG. 2b is a schematic representation of a second embodiment of the first step of the process which involves the preparation of a liquid seasoning.

In a second embodiment of the process shown in FIG. 2b, a quantity of liquid 12 is introduced into a container 14. Container 14 is activated to heat liquid 12 to a first temperature that is sufficient to boil liquid 12. Preferably, that first temperature is around 400° F. Once liquid 12 in container 14 is at the first temperature, a quantity of stock 18 and/or a quantity of dry fat 20 is added to the boiling liquid 12 in container 14 to produce a liquid-fat mixture 22. Stock 18 may be chicken stock, beef stock, vegetable stock, fish stock or any other type of stock that is compatible with the rice flavor to be produced. Preferably, stock 18 is in a liquid form. Fat 20 preferably is a dry chicken fat, dry beef fat, butter or oil that is compatible with the rice flavor to be produced. Liquid-fat mixture 22 is heated until boiling, preferably at about the same first temperature (i.e., around 400° F.) and is then boiled for a time period of thirty minutes.

Seasoning mixture 15 is then added to liquid-fat mixture 22 to produce a liquid seasoning mixture 24 comprised of water, stock, fat and spices. Liquid seasoning mixture 24 is heated to boiling, again preferably to around 400° F., and is boiled for a time period of about thirty minutes. It will be understood that seasoning mixture 15 may be added to liquid 12 and boiled prior to the addition of stock 18 and/or fat 20 and then boiling the liquid seasoning mixture so formed without departing from the scope of the present invention. It is preferable, however, to add stock 18 and/or fat 20 before adding seasoning mixture 15. This is done because fat 20, especially, may aid in bringing out and developing the flavors of the spices in seasoning mixture 15.

Liquid seasoning mixture 24 is then poured out of container 14 and is strained through a screen 26, preferably a 60 mesh screen, and into another container 28 to remove any particles and sediments. Container 28 therefore contains a strained liquid seasoning 24A. Preferably, at this point, approximately 20 lb of strained liquid seasoning 24A has been produced and is set aside in container 28 for flavoring of around 100 lbs of rice.

Depending on the flavoring that is desired in the rice, it may be desirable to also add a quantity of dried meat and/or a quantity of dried vegetables to the liquid seasoning. The dried meat, which may be dried beef or dried chicken, for example, and the dried vegetables, such as flakes of carrot, onion or celery, for example, may be added directly to liquid 12, or to liquid seasoning mixture 16 or 24 and be boiled along with spices 10, stock 18 or fat 20 to further enhance the flavor of strained liquid seasoning mixture 21 or 24A.

Strained liquid seasoning 24A is the one that will be referenced to describe the remaining steps of the process in accordance with the present invention, although it should be understood that the remaining description applies equally to strained liquid seasoning 21.

Figure 3:
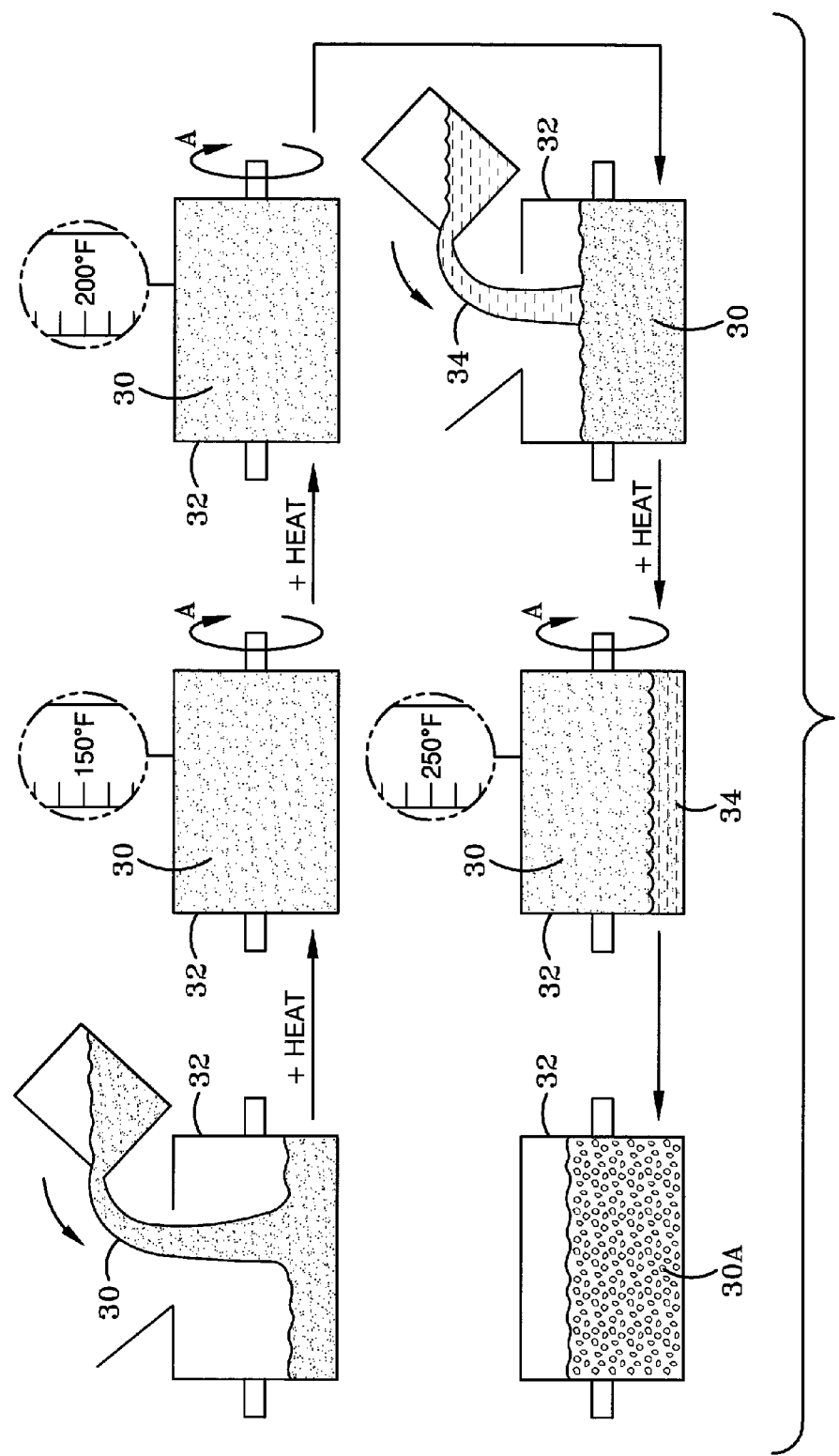
FIG. 3 is a schematic representation of the second step of the process which involves increasing the porosity of the cereal grains.

The second step in the process is shown in FIG. 3 and involves the increasing the porosity of the rice grains. A quantity of rice grains 30 is introduced into a tumbler 32. Preferably, rice 30 is a long-grained white rice but any other variety of rice such a basmati rice or a parboiled rice will work equally well. Tumbler 32 is activated to heat rice 30 to a temperature of about 150° F. and is rotated as indicated by arrow "A". Rice 30 is tumbled in tumbler 32 for a time period of about twenty minutes. The temperature in tumbler 32 is increased from the second temperature of about 150° F. to a third temperature of about 200° F. and rice 30 is tumbled in tumbler 32 for a time period of about twenty minutes. A quantity of water 34 is then added into tumbler 32. The quantity of water 34 required is equal to about 20% of the quantity of rice 30 in tumbler 32. So, for example, if 100 lbs of rice 30 is being processed in tumbler 32, 20 lbs of water 34 will be introduced into tumbler 32. The temperature in tumbler 32 is increased again to a fourth temperature of about 250° F. while rotating the tumbler 32 for an additional time period of about twenty minutes. The rice grains in tumbler 32 are now "open" or sufficiently porous to permit liquid to penetrate into the interior of the grains and these more-porous rice grains are represented by the reference character 30A. The term "open" is not used to indicate that grains 30A have popped open in a manner similar to popped popcorn but is, instead, meant to indicate that instead of the interior of the rice grain 30A being closed or non-permeable, the process has made the exterior of the grain more permeable to liquid. Up until the time that the rice grains are opened by step 2 of this process, they are substantially non-porous and liquid of any type is essentially prevented from penetrating through the exterior of the grain and into the interior thereof.

The third step in the process is illustrated in FIG. 4 and involves the infusion of flavor from strained liquid seasoning 24A and into the open or more-porous rice grains 30A. The quantity of liquid seasoning 24A produced in step 1 is now introduced into a kettle 36 and is heated to a temperature of around 400° F. The heated liquid seasoning 24A is passed through a steam applicator 38 which is operationally connected to tumbler 32. Steam applicator 38 heats strained liquid seasoning 24A to a sufficient degree to produce a seasoned steam 24B that is then sprayed into tumbler 32 and onto open rice grains 30A as they are tumbled. Preferably, batches of seasoned steam 24B are introduced into tumbler 32 every forty-five minutes over the course of about a three hour time period. Each batch contains about 5 lbs of seasoned steam 24B. Tumbler 32 includes a steam exhaust system 40 which is set at low and channels spent steam 42 out of tumbler 32 to prevent pressure from building up in tumbler 32.

As illustrated in FIG. 4a, the liquid in seasoned steam 24B penetrates into the interior of each rice grain 30A and displaces the water 34 that was initially added to tumbler 34 to open rice grain 30. The displaced water 34 is pushed out of the interior of rice grain 30A. Because seasoned steam 24B is flavored, when steam 24B enters the interior of rice grain 30A, the flavoring thereof is transferred into the interior of the grain 30A. Essentially, there are two forces at work here, namely, the positive addition of seasoned steam 24B into the plurality of open rice grains 30A and the simultaneous negative removal of water 34 from those open rice grains 30A. Because of the heat in tumbler 32, the water 34 which exits grains 30A tends to evaporate and be evacuated from tumbler 32 as part of spent steam 42. After the approximate three hour time period that seasoned steam 24B is added to tumbler 32, the rice grains have become flavor-infused rice grains that are represented by reference character 30B in the figures. Rice grains 30b have been fully infused with the flavors from the seasoned steam 24B.

The fourth step in the process is illustrated in FIG. 5 and is directed to locking the flavor imparted by the seasoned steam 24B into the flavor-infused rice grains 30B. This is essentially accomplished by drying rice grains 30B. Firstly, steam applicator 38 is shut off, by closing a valve 44, for example, to prevent any further introduction of seasoned steam 24B into tumbler 32. Steam exhaust system 40 is then set to "high" to increase the flow of spent steam 42 from within tumbler 32 as it continues to rotate. The infused rice 30B is tumbled in tumbler 32 for an additional time period of about one hour. Every twenty minutes during this hour, the temperature is decreased by about 50° F. from a starting temperature of 250° F., until a final temperature of around 100° F. is reached. The rice is dry at this point and the flavors are locked into the same. The dried rice, now represented by reference character 30C, is removed from tumbler 32 as shown at 46 and after removal thereof, rice 30C continues to cool until it reaches ambient temperature. At this point, the dried infused rice 30C is ready for packaging by placing it in boxes 48 or other suitable containers such as bags.

The following are examples and quantities of the spices, liquids an fats used to prepare three different flavors of rice using the process of the present invention:

EXAMPLE 1

Roasted Chicken and Wild Rice

| Parboiled Rice: | 100 lbs |
| --- | --- |
| Water: | 100 lbs |
| Chicken Broth: | 20 lbs |
| Chicken Fat (dry): | 2 kg |
| Dry Chicken Meat: | 0.5 kg |
| Seasoning Mixture: | |
| Corn Syrup Solids: | 1 kg |
| Salt: | 1 kg |
| Garlic Powder: | 1 kg |
| Onion Powder: | 500 g |
| Sage oil: | 20 ml |
| Herb oil: | 40 ml |
| Turmeric: | 40 g |
| Paprika: | 40 g |
| Roasted Chicken Autolysed Yeast Extract | 1 kg |
| Wild Rice: | 100 g |

The roasted chicken and wild rice version of the flavor-infused rice of the present invention is prepared by following the methodology shown and described with reference to FIG. 1, FIG. 2b, FIG. 3, FIG. 4 and FIG. 5. The wild rice is mixed with the flavor-infused rice grains 30C after removal thereof from tumbler 32 and before packaging thereof.

EXAMPLE 2

Chicken Herb

| Parboiled Rice: | 100 lbs |
| --- | --- |
| Water: | 100 lbs |
| Chicken Broth: | 20 lbs |
| Chicken Fat (dry): | 2 kg |
| Dry Chicken Meat: | 1 kg |
| Seasoning Mixture: | |
| Corn Syrup Solids: | 800 g |
| Salt: | 800 g |
| Garlic Powder: | 500 g |
| Onion Powder: | 300 g |
| Paprika Powder: | 80 g |
| Turmeric Powder: | 40 g |
| Rosemary Oil: | 20 ml |
| Basil Oil: | 20 ml |
| AYE Yeast Extract (Chicken Flavor) | 1.5 kg |

The chicken herb version of the flavor-infused rice of the present invention is prepared by following the methodology shown and described with reference to FIG. 1, FIG. 2b, FIG. 3, FIG. 4 and FIG. 5.

EXAMPLE 3

Garlic and Butter

| | |
|---|---|
| Parboiled Rice: | 100 lbs |
| Water: | 100 lbs |
| Seasoning Mixture: | |
| Salt: | 2 kg |
| Dextrose: | 1 kg |
| Garlic Powder: | 1 kg |
| Onion Oil: | 500 g |
| Butter oil flavoring: | 60 g |
| Turmeric Powder: | 60 g |
| Vegetable Flakes Blend (carrot, celery, potato) | 2 kg |
| Hydrolyzed Plant Protein: | 1 kg |

The garlic and butter version of the flavor-infused rice of the present invention is prepared by following the methodology shown and described with reference to FIG. 1, FIG. 2a, FIG. 3, FIG. 4 and FIG. 5.

It will be understood that a wide variety of differently configured recipes for the flavoring for the rice may be prepared without departing from the scope of the present invention. The above examples are given by way of example only.

One of the benefits of processing rice in this fashion is that the cook-time on the part of the consumer is greatly reduced over the cook-time of rice that is not processed in this fashion. For example, an unprocessed long-grain white rice will take approximately 25 minutes to cook while a processed long-grain white rice will take around 10 minutes to cook.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method of infusing flavor into cereal grains, said method comprising the steps of:
   placing a quantity of cereal grains into a tumbler;
   heating the tumbler from a first temperature to a second temperature, thereby heating the cereal grains;
   rotating the tumbler with the cereal grains therein for a period of time;
   heating the cereal grains in the tumbler to a third temperature;
   rotating the tumbler for a period of time;
   adding a quantity of a first liquid into the tumbler;
   heating the cereal grains and the first liquid to a fourth temperature while rotating the tumbler;
   preparing a liquid seasoning having a flavor;
   heating the liquid seasoning until it turns into seasoned steam;
   spraying the seasoned steam into the tumbler and onto the cereal grains;
   shutting off the steam;
   drying the cereal grains; and
   removing the dried cereal grains from the tumbler.

2. The method as defined in claim 1, wherein the step of preparing the liquid seasoning comprises the steps of:
   selecting a first spice;
   adding the first spice to a quantity of a second liquid to make a mixture; and
   boiling the mixture for a first period of time.

3. The method as defined in claim 2, further comprising the step of:
   boiling the second liquid prior to adding the first spice thereto.

4. The method as defined in claim 2, further comprising the steps of:
   straining the mixture through a screen after boiling.

5. The method as defined in claim 4, further comprising the steps of:
   selecting one or more additional spices; and
   adding the one or more additional spices to the mixture prior to boiling the same for the first period of time.

6. The method as defined in claim 3, further comprising the steps of:
   adding a quantity of a fat and/or an oil to the second liquid to make a liquid-fat mixture prior to adding the first spice thereto; and
   boiling the liquid-fat mixture for a second period of time prior to the addition of the first spice thereto.

7. The method as defined in claim 6, wherein the second liquid and the liquid-fat mixture are each boiled at a first temperature of around 400° F.; and wherein each of the first period of time and second period of time is around thirty minutes.

8. The method as defined in claim 6, further comprising the steps of:
   selecting one or more additional spices; and
   adding the one or more additional spices to the liquid-fat mixture at substantially the same time as adding the first spice thereto.

9. The method as defined in claim 4, further comprising the step of:
   adding a quantity of dried meat and/or a quantity of dried vegetables to the mixture.

10. The method as defined in claim 5, wherein the steps of selecting the first spice and selecting the one or more additional spices includes selecting from a variety of dry spices and/or from a variety of plant oils or extracts.

11. The method as defined in claim 2, wherein the second liquid is water and the method further comprises the step of:
    adding a quantity of a meat, seafood, and/or vegetable stock to the water.

12. The method as defined in claim 1, wherein the second temperature is around 150° F., the third temperature is around 200° F., and the fourth temperature is around 250° F.

13. The method as defined in claim 1, wherein each of the third and fourth time periods is about twenty minutes long.

14. The method as defined in claim 1, wherein subsequent to the step of spraying the seasoned steam the method further comprises the step of:
    rotating the tumbler for a fifth period of time to expose the cereal grains to the seasoned steam.

15. The method a defined in claim 14, wherein the seasoned steam is sprayed into the tumbler in batches, wherein the batches are spaced at around forty-five minute intervals from each other, and wherein the grains of cereal are tumbled in the tumbler for about three hours.

16. The method as defined in claim 15, wherein the seasoned steam forces the first liquid which soaked into the cereal grains during the step of heating the cereal grains and the first liquid to the fourth temperature, out of the cereal grains, and the seasoned steam thereby replaces that forced-out first liquid.

17. The method as defined in claim 14, further comprising the step of:
   evacuating a quantity of steam from the tumbler while it is rotating.

18. The method a defined in claim 17, wherein the evacuation of the steam from the tumbler occurs substantially continuously while additional seasoned steam is being introduced into the tumbler.

19. The method as defined in claim 18, wherein the step of drying the grains of cereal further comprises the steps of:
   stopping the flow of seasoned steam into the tumbler; and
   increasing the rate of evacuation of steam from the tumbler.

20. The method as defined in claim 19, wherein the step of drying grains of cereal further comprises the steps of:
   reducing an initial interior temperature of the tumbler by a first amount after a sixth period of time;
   reducing the interior temperature of the tumbler by a second amount after a seventh period of time; and
   continuing to decrease the interior temperature of the tumbler over additional periods of time until a pre-determined interior temperature of the tumbler is reached.

21. The method as defined in claim 20, wherein the initial temperature is around 250° F. and the pre-determined interior temperature is around 100° F., and wherein the sixth, seventh, and each additional time period is around twenty minutes long.

22. The method as defined in claim 20, further comprising the steps of:
   cooling the removed grains of cereal to ambient temperature.

23. The method as defined in claim 22, further comprising the step of:
   packaging the grains of cereal after they have reached ambient temperature.

* * * * *